United States Patent
Meekma et al.

(10) Patent No.: US 7,752,876 B2
(45) Date of Patent: Jul. 13, 2010

(54) LOCKOUT DEVICE

(75) Inventors: Glenn P. Meekma, Menomonee Falls, WI (US); Christopher Rohde, West Allis, WI (US); Jesse A. Marcelle, Muskego, WI (US); Mark Johnson, Hubertus, WI (US); Michael Brojanic, Jackson, WI (US)

(73) Assignee: Master Lock Company LLC, Oak Creek, WI (US)

( * ) Notice: Subject to any disclaimer, the term of this patent is extended or adjusted under 35 U.S.C. 154(b) by 581 days.

(21) Appl. No.: 11/695,431

(22) Filed: Apr. 2, 2007

(65) Prior Publication Data
US 2007/0220932 A1    Sep. 27, 2007

Related U.S. Application Data

(63) Continuation-in-part of application No. 10/707,809, filed on Jan. 14, 2004, now Pat. No. 7,197,904.

(60) Provisional application No. 60/439,885, filed on Jan. 14, 2003.

(51) Int. Cl.
*F16K 35/10* (2006.01)

(52) U.S. Cl. .............................. 70/164; 70/178; 70/180; 70/209; 70/DIG. 58

(58) Field of Classification Search .................. 70/209, 70/202, 203, 211, 212, 14, 423–428, 158–173, 70/455, 232, DIG. 58, 175–180; 220/254.1, 220/254.9, 252, 345.2, 8, 4.22, 4.23, 4.25, 220/4.21, 4.24; 206/1.5, 303, 398; 137/382–385; 200/43.14, 43.15, 43.22; 292/307 B; 285/45, 285/80

See application file for complete search history.

(56) References Cited

U.S. PATENT DOCUMENTS

| | | | | |
|---|---|---|---|---|
| 878,395 | A | * 2/1908 | Holsters | 16/93 R |
| 1,395,532 | A | * 11/1921 | Tilden | 70/212 |
| 2,569,037 | A | 9/1951 | Dalton | |
| 2,596,316 | A | * 5/1952 | White | 220/592.02 |
| 2,761,112 | A | 8/1956 | Torcivia | |
| 3,061,194 | A | 10/1962 | Nichols et al. | |
| 3,344,393 | A | 9/1967 | Hendee | |
| 3,944,189 | A | * 3/1976 | Singleton | 366/192 |
| 4,219,693 | A | * 8/1980 | French | 174/135 |
| 4,381,063 | A | 4/1983 | Leong | |
| 4,560,078 | A | * 12/1985 | Dubuisson | 220/4.26 |
| 4,615,461 | A | * 10/1986 | Liu | 220/815 |
| 4,643,505 | A | 2/1987 | House et al. | |

(Continued)

*Primary Examiner*—Lloyd A Gall
(74) *Attorney, Agent, or Firm*—Calfee, Halter & Griswold LLP

(57) ABSTRACT

A lockout device includes an inner housing and an outer housing. The inner housing has an upper end portion, a lower end portion, an arcuate outer portion extending between the upper and lower end portions, and a central bearing portion extending outward from at least one of the upper and lower end portions. The outer housing has an upper end portion, a lower end portion, an arcuate outer portion extending between the upper and lower end portions, and a central opening disposed on at least one of the upper and lower end portions and sized to receive and bear against the central bearing portion of the inner housing for telescopic rotation of the inner housing with respect to the outer housing. The outer housing is sized to at least partially receive the inner housing when the inner and outer housing are rotated to an open position.

21 Claims, 17 Drawing Sheets

U.S. PATENT DOCUMENTS

| | | | |
|---|---|---|---|
| 4,899,564 A * | 2/1990 | Gilbert | 70/428 |
| 5,016,772 A * | 5/1991 | Wilk | 220/8 |
| 5,052,939 A | 10/1991 | Koch | |
| 5,092,359 A | 3/1992 | Wirth et al. | |
| 5,139,429 A * | 8/1992 | Herman et al. | 439/133 |
| 5,540,067 A * | 7/1996 | Kim | 70/209 |
| 5,555,754 A * | 9/1996 | Ferrante | 70/209 |
| 5,619,873 A * | 4/1997 | Wood | 70/209 |
| 5,782,116 A * | 7/1998 | Ryan et al. | 70/209 |
| 5,836,186 A * | 11/1998 | Winner, Jr. | 70/209 |
| 5,855,128 A * | 1/1999 | Voiculescu | 70/209 |
| 6,186,349 B1 * | 2/2001 | Tempongko | 220/4.22 |
| 6,247,272 B1 * | 6/2001 | Shipman | 52/29 |
| 6,729,472 B2 * | 5/2004 | Stucke et al. | 206/515 |
| 7,165,426 B2 * | 1/2007 | Wyers | 70/14 |
| 7,197,904 B2 | 4/2007 | Marcelle et al. | |
| 2002/0020707 A1 * | 2/2002 | Hardy | 220/252 |

\* cited by examiner

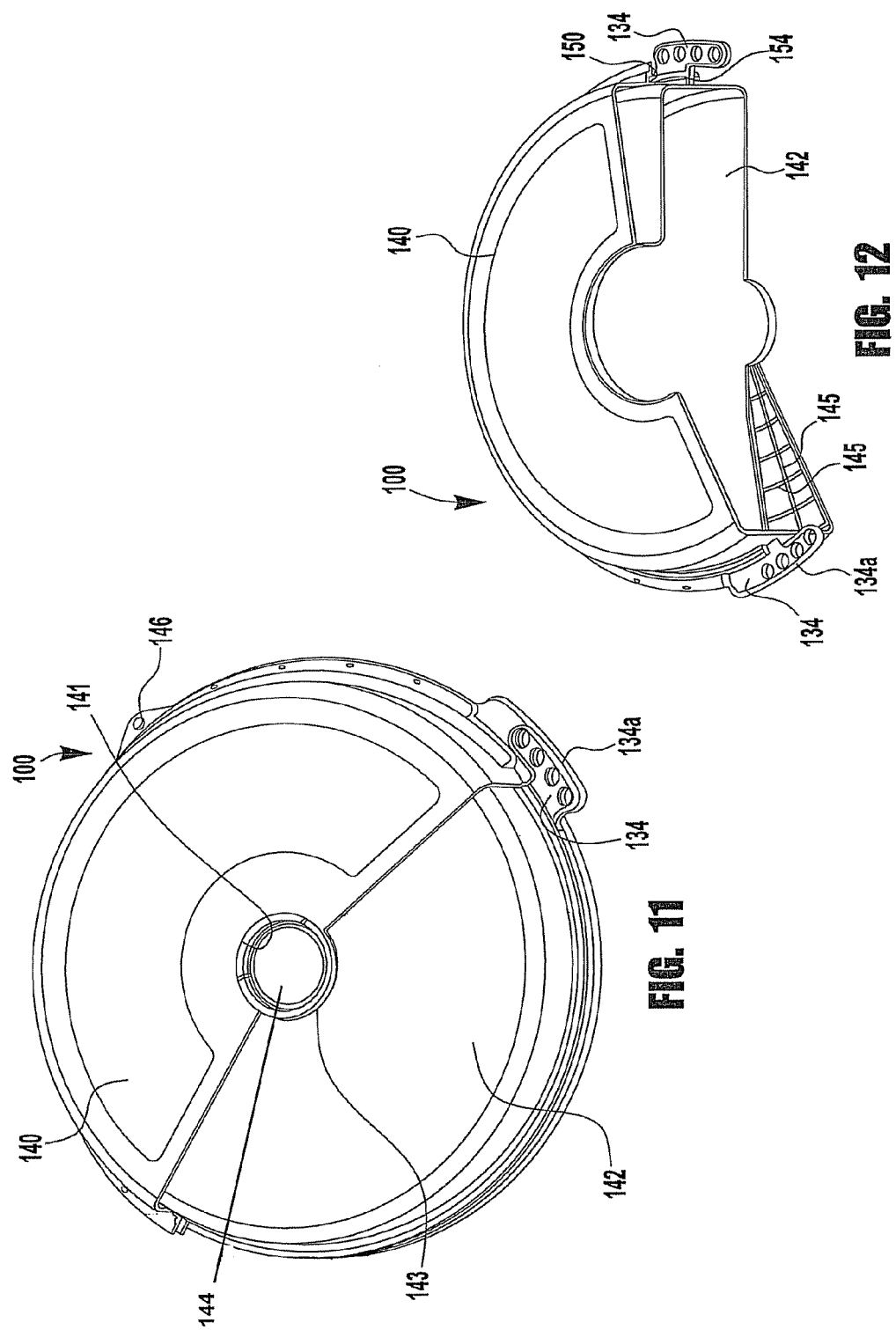

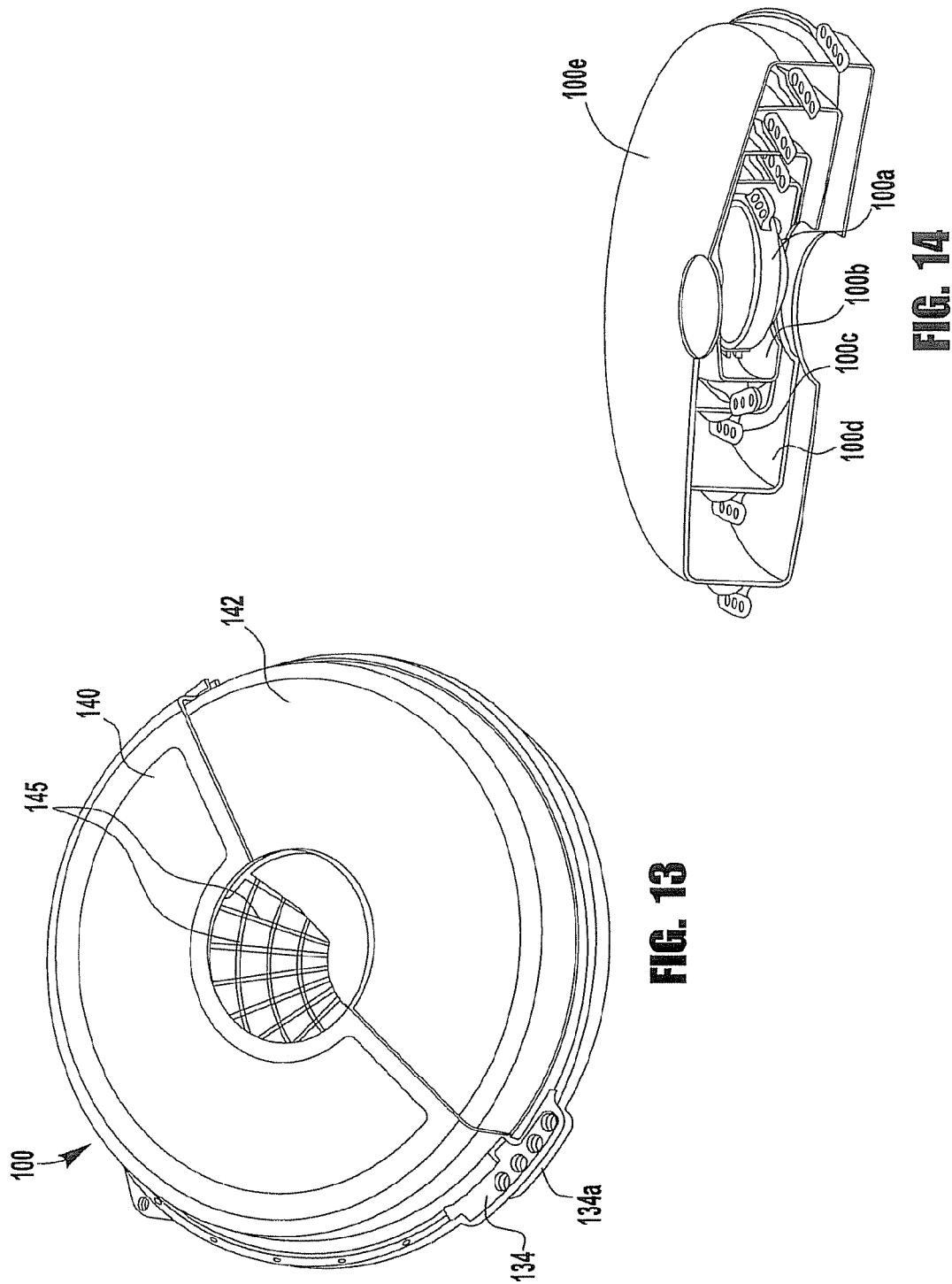

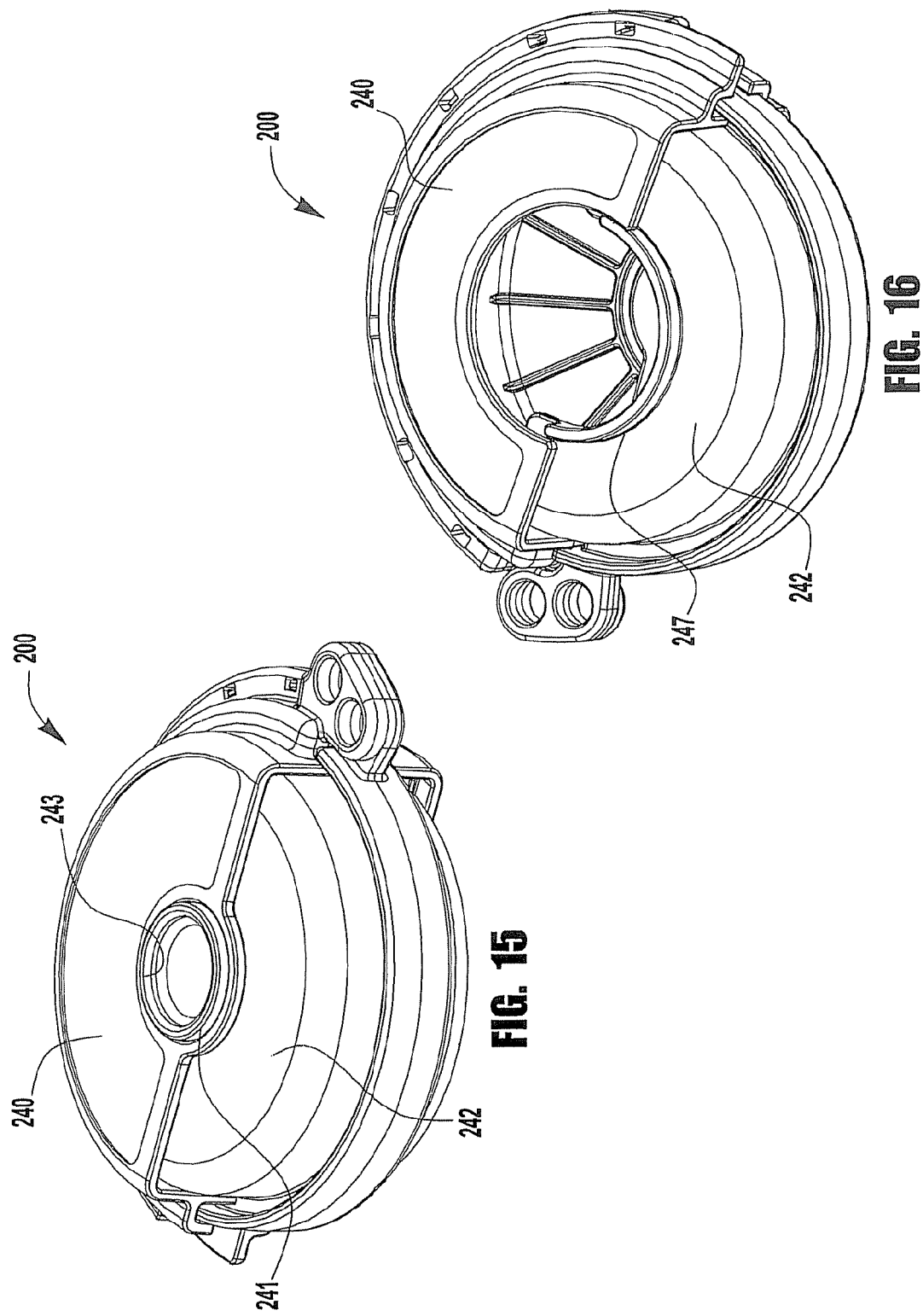

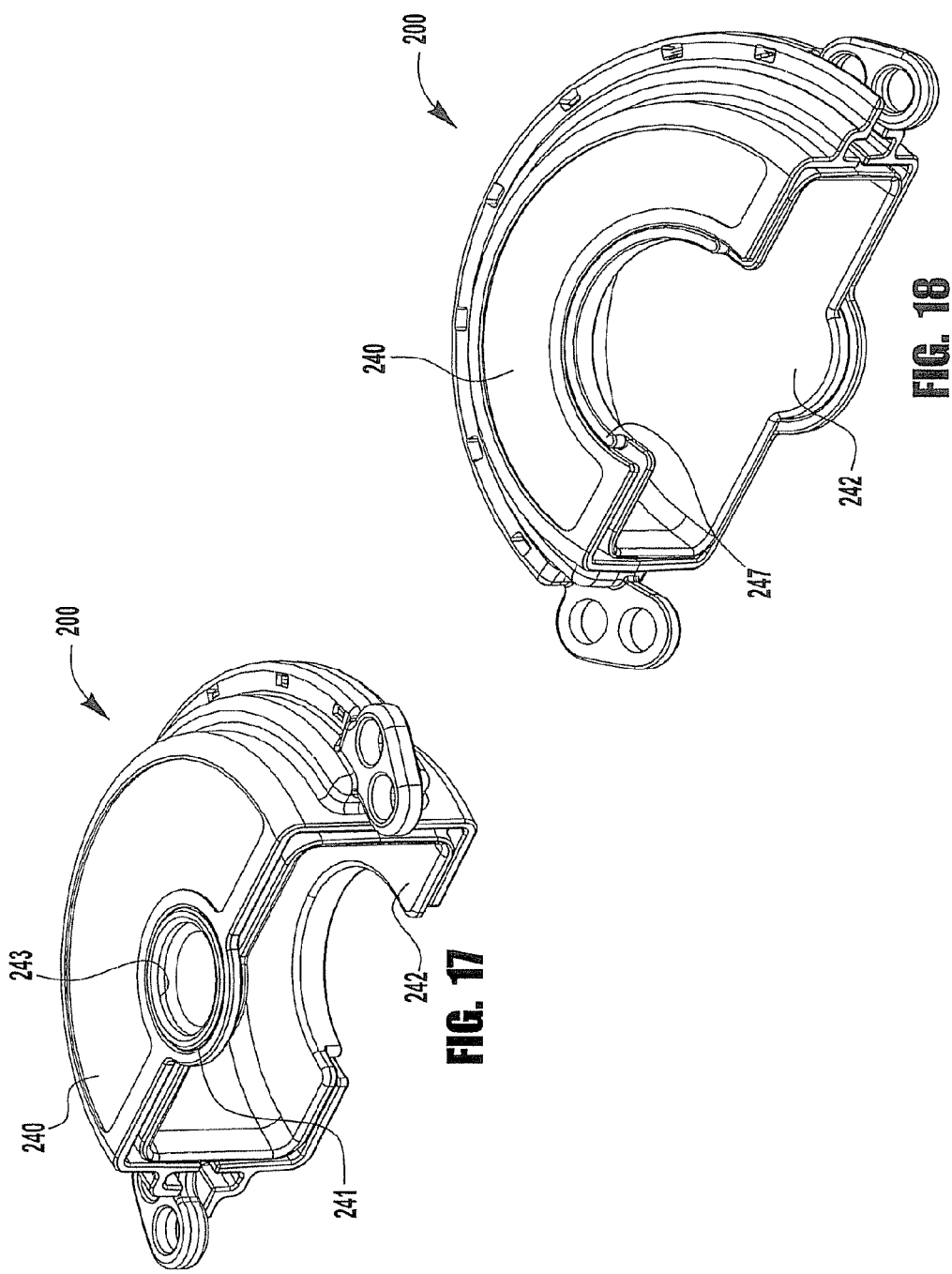

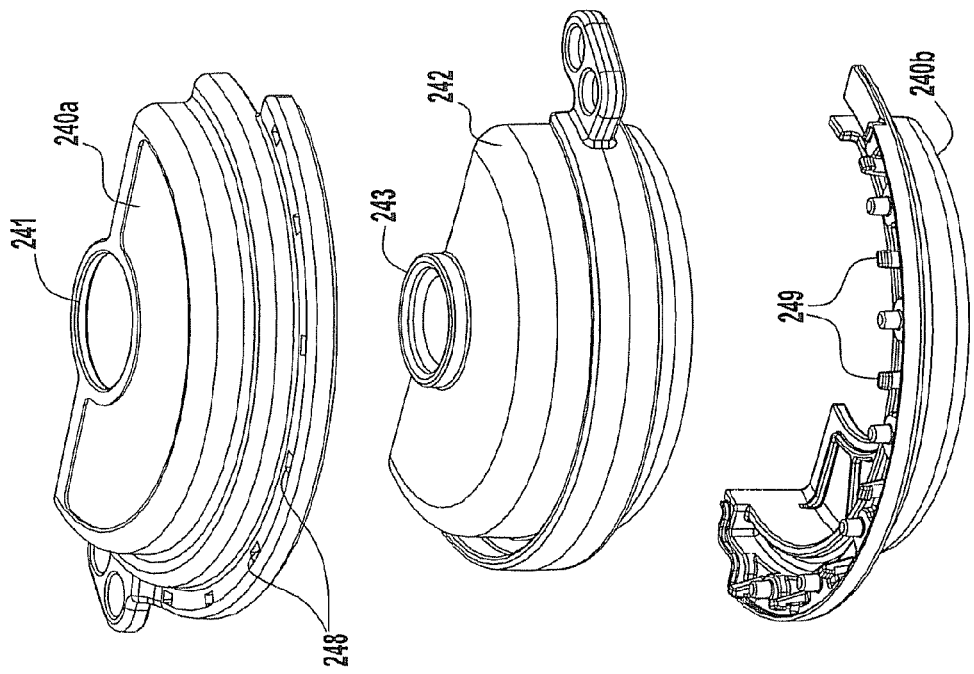
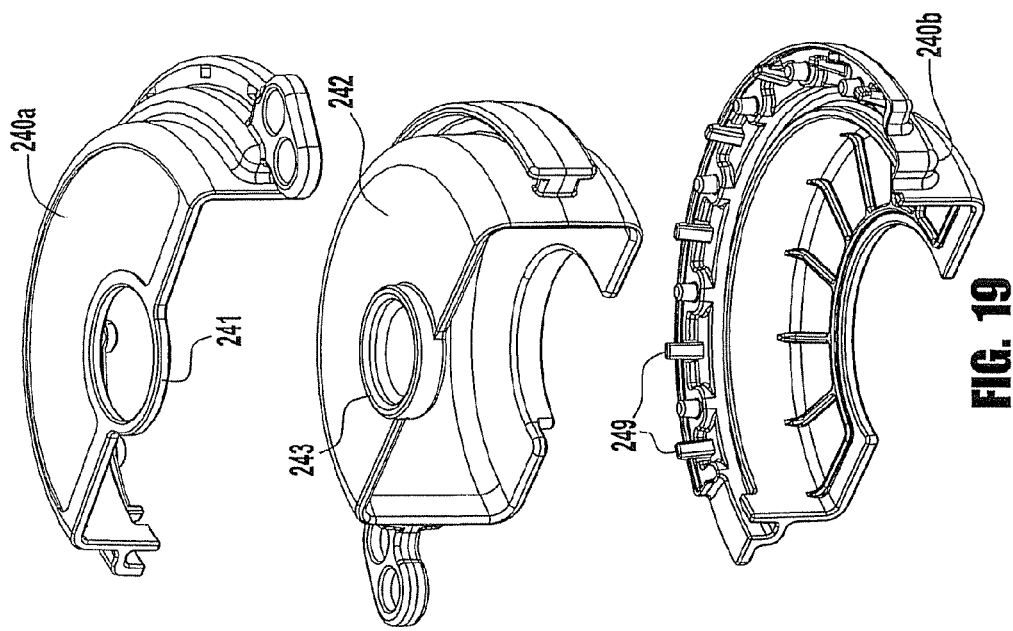

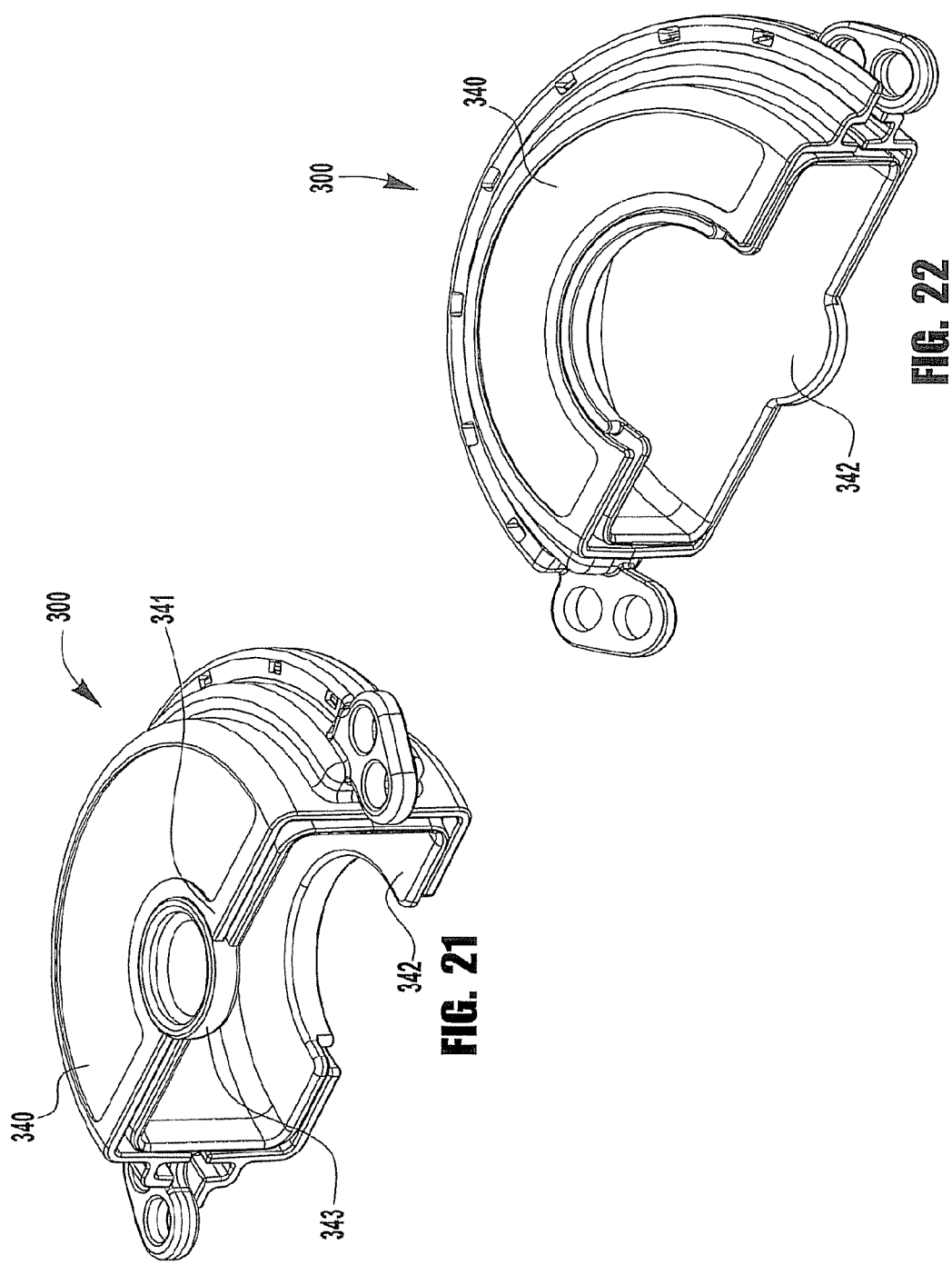

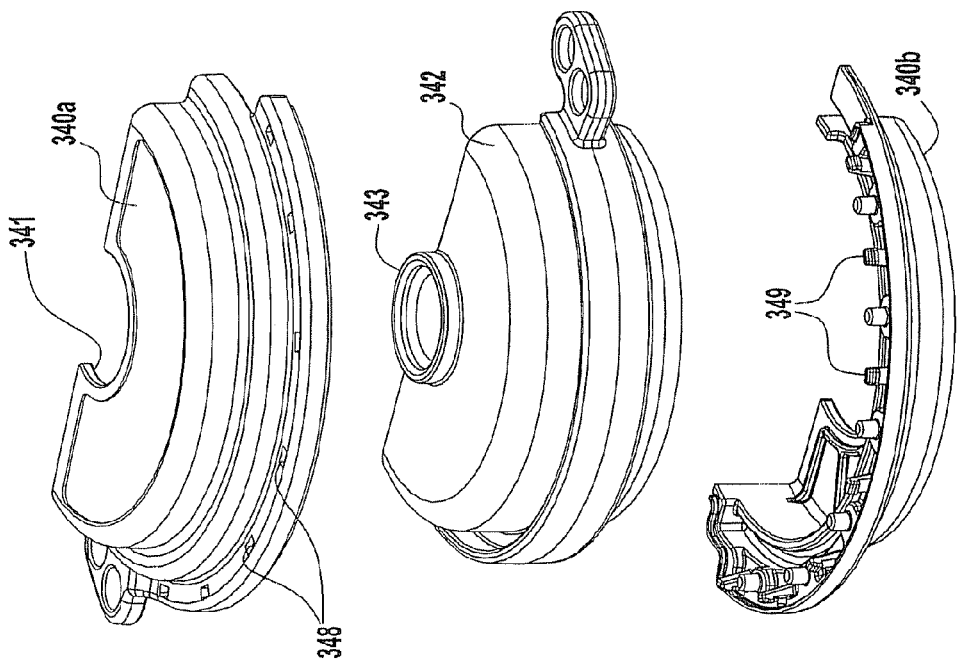
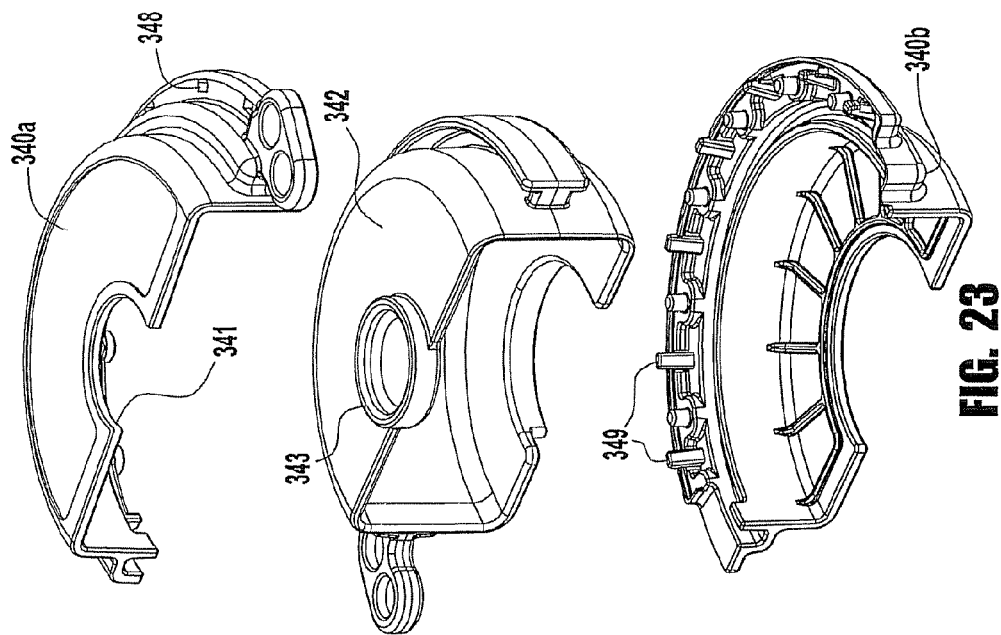

LOCKOUT DEVICE

CROSS-REFERENCE TO RELATED APPLICATIONS

This application is a continuation-in-part of U.S. patent application Ser. No. 10/707,809, filed on Jan. 14, 2004, now U.S. Pat. No. 7,197,904, which claims priority to U.S. Provisional Patent Application Ser. No. 60/439,885, filed on Jan. 14, 2003, the entire disclosures of which are hereby incorporated by reference to the extent that they are not conflicting with the present application.

BACKGROUND

Lockout devices provide enclosures that surround or encase an apparatus for the purpose of preventing unauthorized access to and tampering with the apparatus. For example, lockout devices shaped as closed ended cylinders or ellipsoids, with hollow interiors, are used to enclose apparatuses such as valves, valve handles, electrical connections, doorknobs, air hoses, and the like. The lockout devices, when attached to or installed on an apparatus, such as a gate valve, prevent a person from changing the setting on the valve. Likewise, a lockout device attached to one end of an electrical cord, prevents connection of that electrical cord to an outlet or another electrical cord. Likewise, a lockout device attached to an electrical connection, for example a connection of two different electrical cords, prevents disconnection of the connected electrical cords.

Prior art lockout devices often comprise two half cylindrical shells, each half-shell being connected to the other by hinges. The hinges allow the two half-shells to be opened and closed around the apparatus to be protected (e.g., valve or electrical connection). Such hinged designs are often difficult to install onto an apparatus in a confined area (i.e., in tight quarters) because opening and closing of the device requires a large amount of space. The hinged lockout devices also occupy a large amount of storage space, which is disadvantageous when the devices are not being used and are being stored. As such, there is a need for new lockout device designs that can be installed in tight quarters and occupy a small amount of storage space.

SUMMARY

The present application describes a lockout device that prevents unauthorized access to a gate valve, electrical connection or other apparatus or component. According to one inventive aspect, the lockout device may provide a means for installing the lockout device in confined areas. The lockout device may further be stored when not in use in such a manner that limits the amount of spaced use. According to another inventive aspect, the lockout device may be configured to reduce the bearing surfaces during movement of the lockout device between closed and open positions, for example, to facilitate operation of the lockout device.

Accordingly, in an exemplary embodiment, a lockout device includes an inner housing and an outer housing. The inner housing has an upper end portion, a lower end portion, an arcuate outer portion extending between the upper and lower end portions, and a central bearing portion extending outward from at least one of the upper and lower end portions. The outer housing has an upper end portion, a lower end portion, an arcuate outer portion extending between the upper and lower end portions, and a central opening disposed on at least one of the upper and lower end portions and sized to receive and bear against the central bearing portion of the inner housing for telescopic rotation of the inner housing with respect to the outer housing. The outer housing is sized to at least partially receive the inner housing when the inner and outer housing are rotated to an open position.

BRIEF DESCRIPTION OF THE DRAWINGS

The present application may be more readily understood by reference to the following drawings wherein:

FIG. 11 is an upper perspective view of still another lockout device, shown in the closed position;

FIG. 12 is a lower perspective view of the lockout device of FIG. 11, shown in the open position;

FIG. 13 is a lower perspective view of the lockout device of FIG. 11, shown in the closed position;

FIG. 14 is a perspective view of a nested set of lockout devices;

FIG. 15 is an upper perspective view of another lockout device, shown in the closed position;

FIG. 16 is a lower perspective view of the lockout device of FIG. 15, shown in the closed position;

FIG. 17 is an upper perspective view of the lockout device of FIG. 15, shown in the open position;

FIG. 18 is a lower perspective view of the lockout device of FIG. 15, shown in the open position;

FIG. 19 is an exploded perspective view of the lockout device of FIG. 15;

FIG. 20 is another exploded perspective view of the lockout device of FIG. 15;

FIG. 21 is an upper perspective view of another lockout device, shown in the open position;

FIG. 22 is a lower perspective view of the lockout device of FIG. 21, shown in the open position;

FIG. 23 is an exploded perspective view of the lockout device of FIG. 21; and

FIG. 24 is another exploded perspective view of the lockout device of FIG. 21.

DETAILED DESCRIPTION

Figure 1:
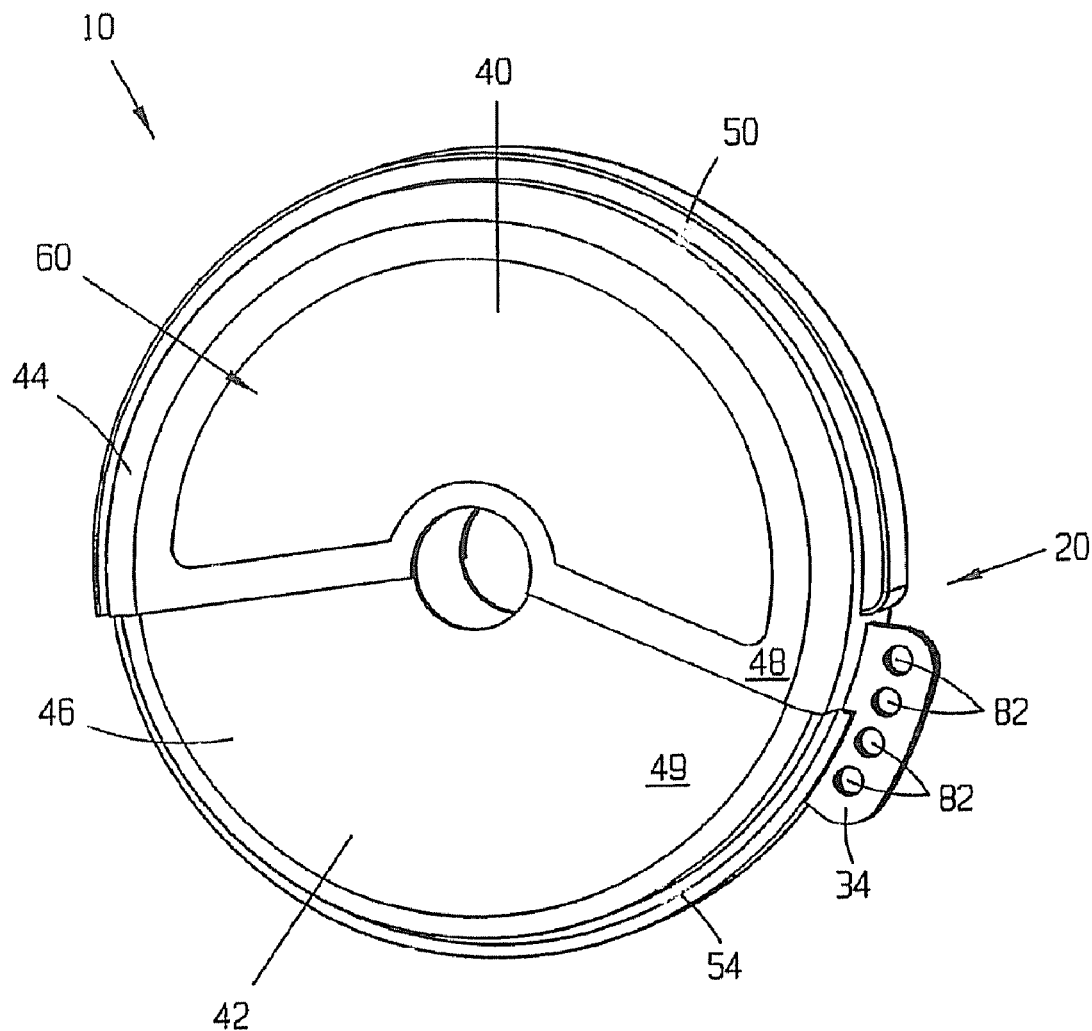
FIG. 1 is a perspective view of a lockout device in the closed position.

The present application contemplates a lockout device 10 that provides an enclosure that surrounds or encases an apparatus, such as a gate valve, electrical plug or electrical connection. The lockout device 10 provides a telescoping feature, generally referred to as 20, that allows the lockout device to be easily attached to or installed on the apparatus in a limited space or area. The telescoping feature 20 also provides for the device to take up a minimal amount of space which is advantageous when the device is not in use and is placed in storage. The lockout device 10 also provides features that prevent prying apart or forcing open of the device once it is attached to or installed on an apparatus. One such feature is a T slot 32. Another such feature are locking tabs 34. Still another such feature is an interlock 36, that is attached to the T slot 32. These features of the present lockout device are described below.

The lockout device 10 includes two generally hollow pieces that, when placed together, surround or encase an apparatus for the purpose of preventing unauthorized access to the apparatus. As shown in FIG. 1, the two pieces of the lockout device are two half cylinders 40 and 42, although other shapes can be used. The shape of the two pieces are generally defined by the geometry of the object which is to be secured. As such, the two pieces can take a number of different shapes and sizes to accommodate various objects. The two pieces 40 and 42 can be made from hard plastic, metal or a thermoform plastic, such as, for example, an injection molded plastic. An example of a type of thermoform plastic is XENOY®.

Herein, a half cylinder is defined as a hollow shape described by the side of a rectangle rotated approximately 180° around its parallel side as axis (a cylinder is defined as a solid figure described by the side of a rectangle rotated 360° around its opposite side as axis). A half cylinder has a radius, which is defined by the length of one of the pair of opposite sides of the rectangle that are perpendicular to the half cylinder's axis. A half cylinder also has a length, which is defined by the length of its axis. Herein, a half cylinder is "closed ended" if its two ends are covered by a flat surface, which is in the shape of a half circle. A cylinder is "open ended" if its ends are not covered.

The two half cylinders 40 and 42 of the lockout 10 device differ from each other in that the radius of one of the half cylinders is slightly less than the radius of the other half cylinder. Also, the two half cylinders 40 and 42 of the device have lengths that differ slightly from one another. The half cylinder with the smaller radius has a slightly shorter length (i.e., the interior half cylinder) than the half cylinder with the larger radius (i.e., the exterior half cylinder). In addition, the two ends 44, 46 of each half cylinder 40 and 42 are closed ended in that the ends are covered by a flat surface which is in the shape of a half circle.

Figure 2:
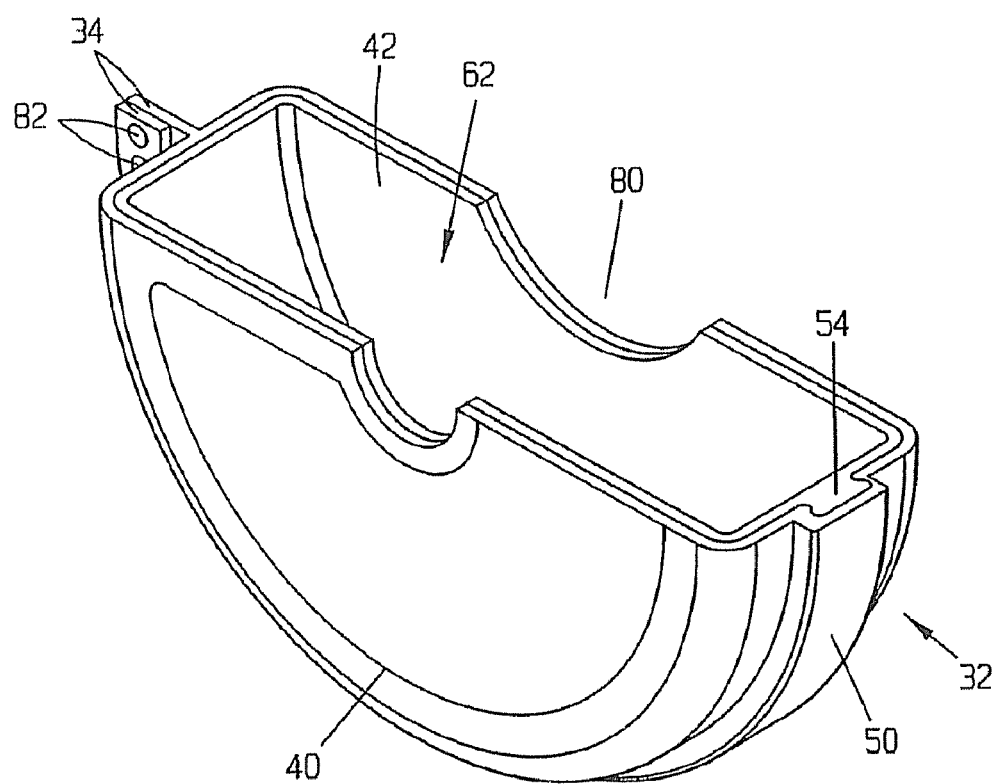
FIG. 2 is a cross-sectional perspective view of the lockout device of FIG. 1 in the open position.
Figure 3:
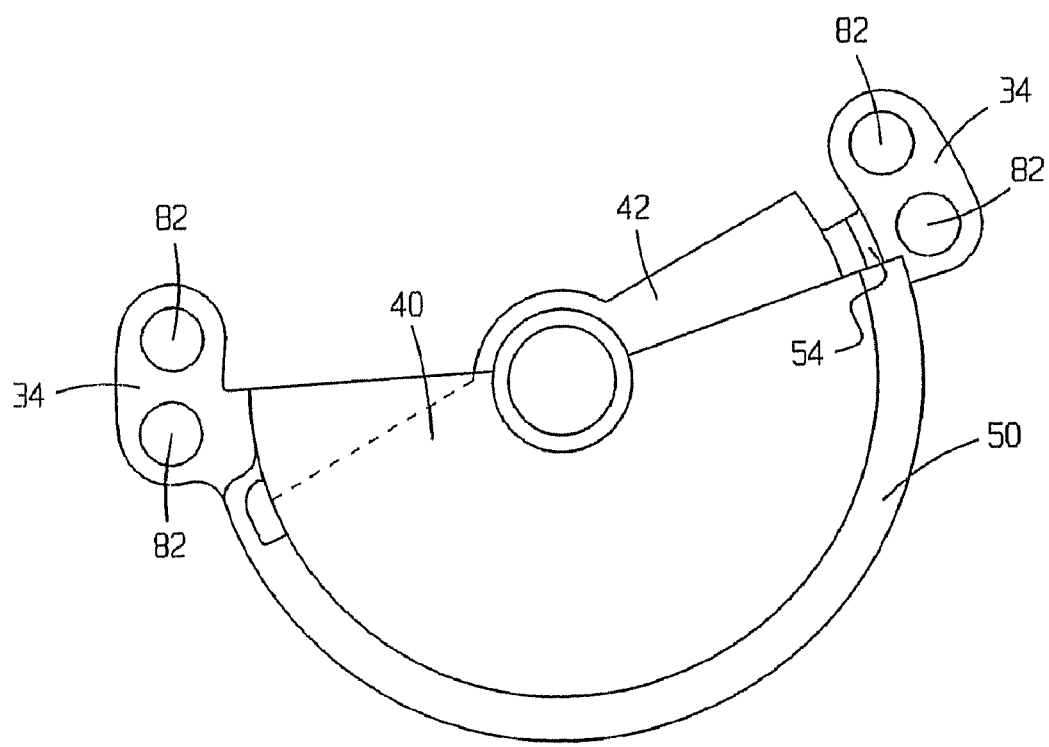
FIG. 3 is a top view of the lockout device of FIG. 1 in the open position.

As is shown in FIGS. 1 and 2, the small difference in the radii and lengths of the two half cylinders 40 and 42 of the lockout device 10 allows for one of the half cylinders, the interior half cylinder 42, to fit or nest within the other half cylinder, the exterior half cylinder 40. When fitted together, the cylinder pieces 40 and 42 are approximately half of the size of the pieces when not fitted together.

Figure 4:
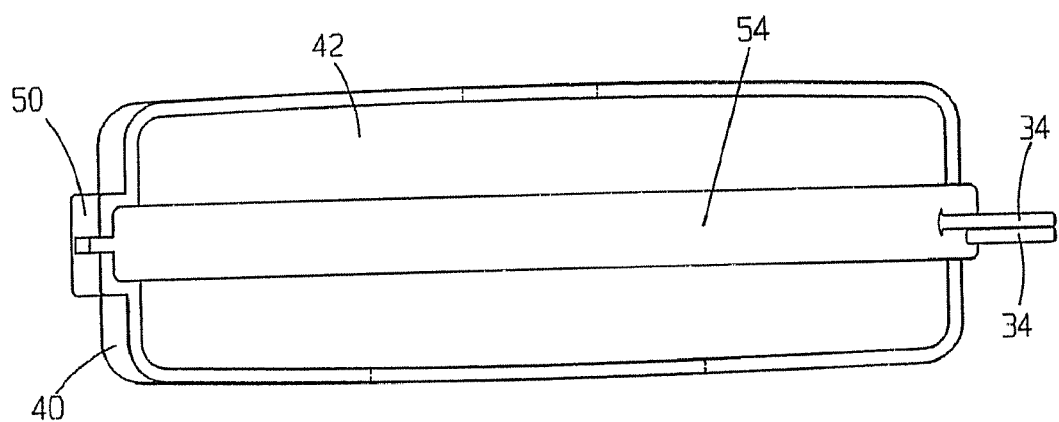
FIG. 4 is a side view of the lockout device of FIG. 1 in the closed position.
Figure 5:
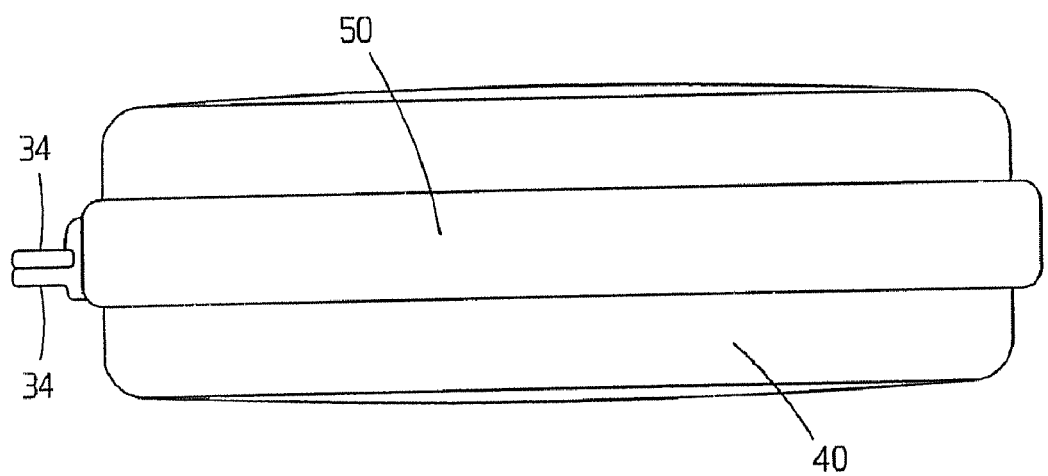
FIG. 5 is a side view of the lockout device of FIG. 1 in the closed position.
Figure 6:
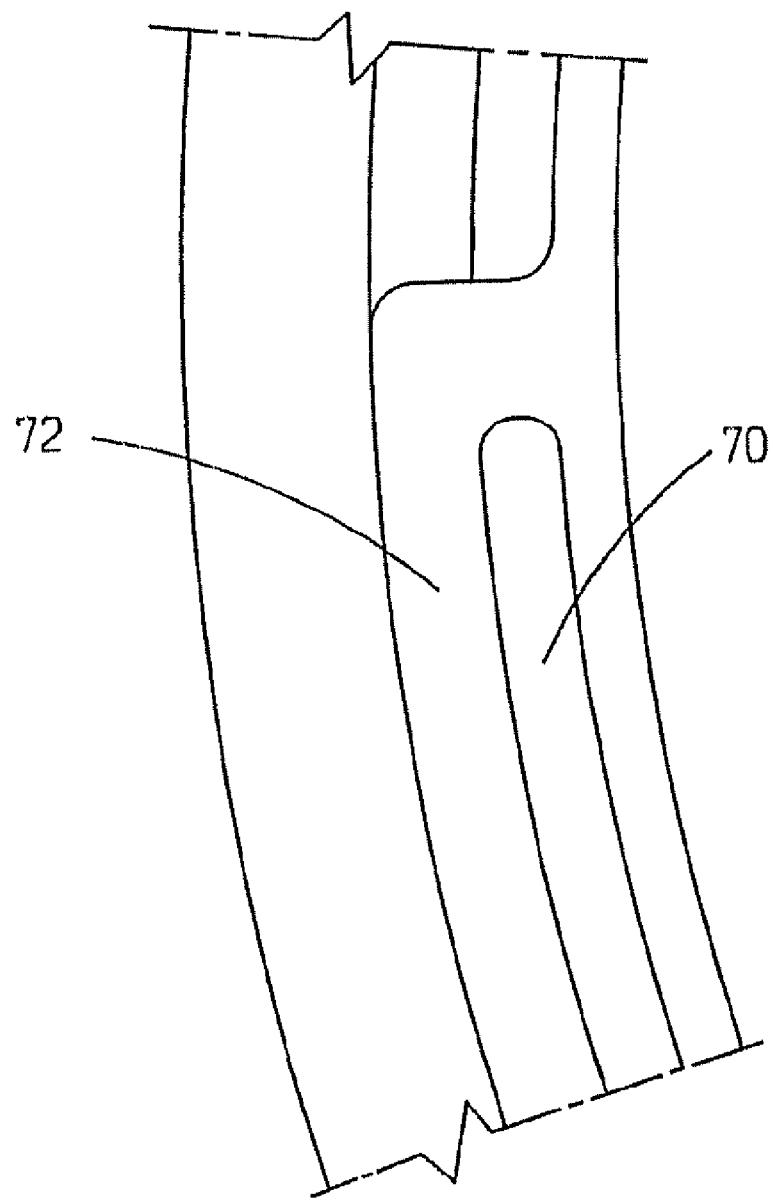
FIG. 6 is a partial cross sectional view of a lockout device in the closed position, showing an interlocking feature.

The lockout device provides a "T slot" feature 32. The T slot 32 provides for rotation of one of the half cylinders about the other for positioning the device in the open or closed positions. As can be seen in FIGS. 2 and 4, the T slot 32 comprises a T slot track 50 that is formed, or attached, along the outside surface 48 (FIG. 1) of the exterior half cylinder 40, and a T slot rail 54 that is attached along the outside surface 49 (FIG. 1) of the interior half cylinder 42. As can be seen from the figures, the T slot rail 54 fits within the T slot track 50. When the lockout device 10 is in the closed position, shown in FIG. 1, and is then rotated into the open position, shown in FIG. 2, the T slot rail 54 slides, or telescopes, into the T slot track 50. Likewise, when the open lockout device 10 is then rotated into the closed position, the T slot rail 54 telescopes out of the T slot track 50.

An additional feature of the lockout device 10 is that one or both of the half cylinders 40 and 42 have one or more areas 60 on their exterior surfaces for writing or for attaching a label, such as an adhesive label, (not shown). The label can be used for identifying the lockout device 10, the apparatus to which it is attached, the key required to unlock a padlock locked onto the device, the reason for the lockout, the conditions required for removal of the lockout device, or some other information. The label areas 60 are preferably recessed areas located on the exterior surface of the lockout device. By having the label recessed, the label will be more difficult to remove, thereby avoid accidental or unauthorized removal.

The T slot rail 54 of the interior half cylinder 42 is positioned within the T slot track 50 of the exterior half cylinder 40. The exterior half cylinder is comprised of two pieces of thermoform plastic which are joined together into a single piece, or alternatively can be formed of a single molded piece. The seam where the two disassembled pieces of the exterior half cylinder are joined together is along the center of the T slot track 50. When the two disassembled pieces of the exterior half cylinder 40 are assembled, they are assembled around the interior half cylinder 42, such that the T slot rail 54 of the interior half cylinder 42 is surrounded by the T slot track 50, which is formed when the two disassembled pieces of the exterior half cylinder are assembled. A variety of standard methods can be used to join the two disassembled pieces of the exterior half cylinder together, such as ultrasonic welding, guide pins, adhesives or combinations thereof.

Figure 9:
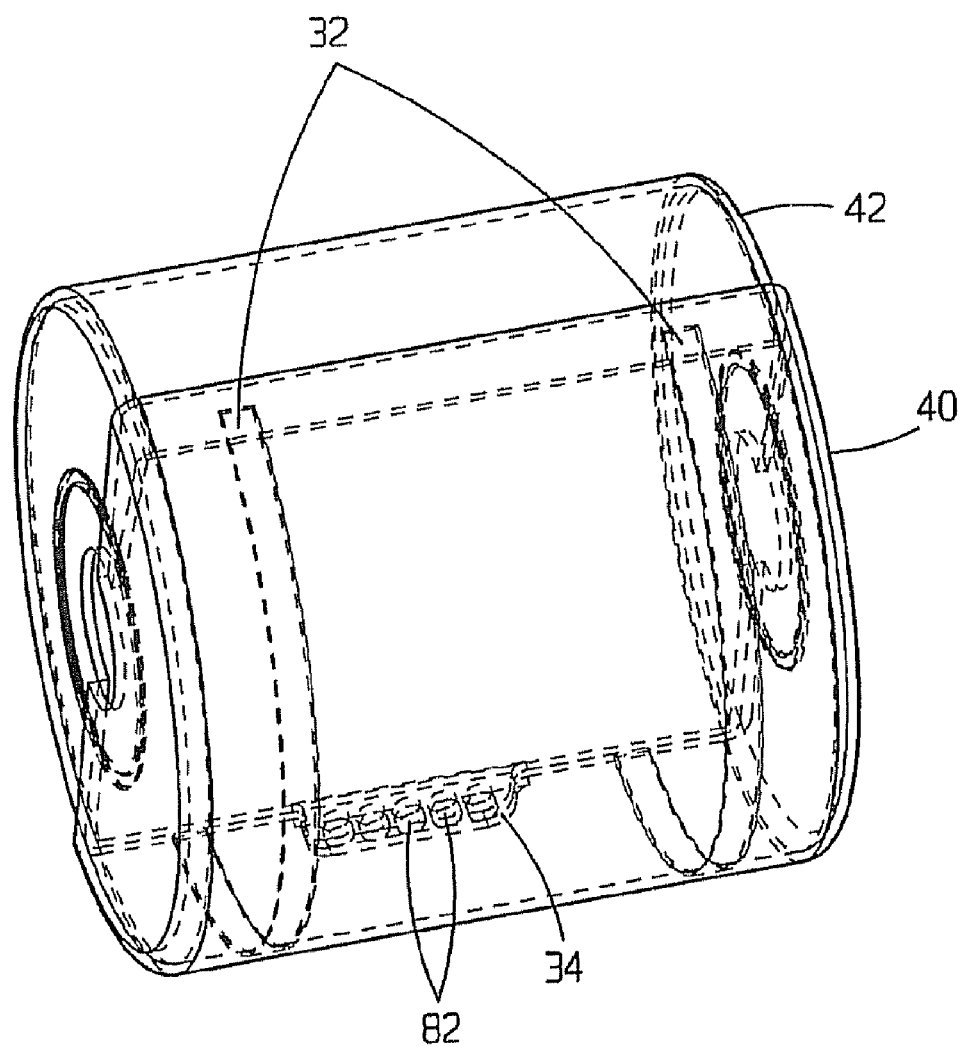
FIG. 9 is a perspective view of an extended length lockout device in the closed position, shown in phantom to illustrate additional features of the lockout device.

The lockout device has one or more T slots 32. For example, lockout devices 10 with a relatively short length have a single T slot 32. As shown in FIG. 9, lockout devices 10 with a relatively long length may have two or more T slots 32. In addition to securing of the exterior and interior half cylinders to one another and making it difficult to pry apart the two half cylinders of a closed lockout apparatus, the T slots 32, particularly multiple T slots on the lockout devices with long lengths, provide stability of the device when it is moved between the open and closed positions. The lockout device 10 may provide other features which make it difficult to pry or force apart the two half cylinders of a closed lockout apparatus.

The rotation of one half cylinder about the other provides the "telescoping" feature of the lockout device 10. Rotation of one half cylinder, while keeping the other half cylinder fixed (i.e., not rotating it) causes the lockout device to move between "closed" (FIG. 1) and "open" (FIG. 2) positions. In the open position, the interior half cylinder 42 overlaps with and generally fits within the exterior half cylinder 40. In the open position, the interior cavity 62 of the lockout device is exposed and the lockout device 10 can be installed on the apparatus or piece of equipment which is to be secured (e.g., gate valve or electrical cord). In the closed position, the interior half cylinder 42 does not overlap with and is not fitted within the exterior half cylinder 40. Instead, the two non-overlapping half cylinders 40 and 42 form a complete cylinder, which completely surrounds or encases whatever apparatus to which it is installed, thereby securing it from accidental or unauthorized use.

Figure 7:
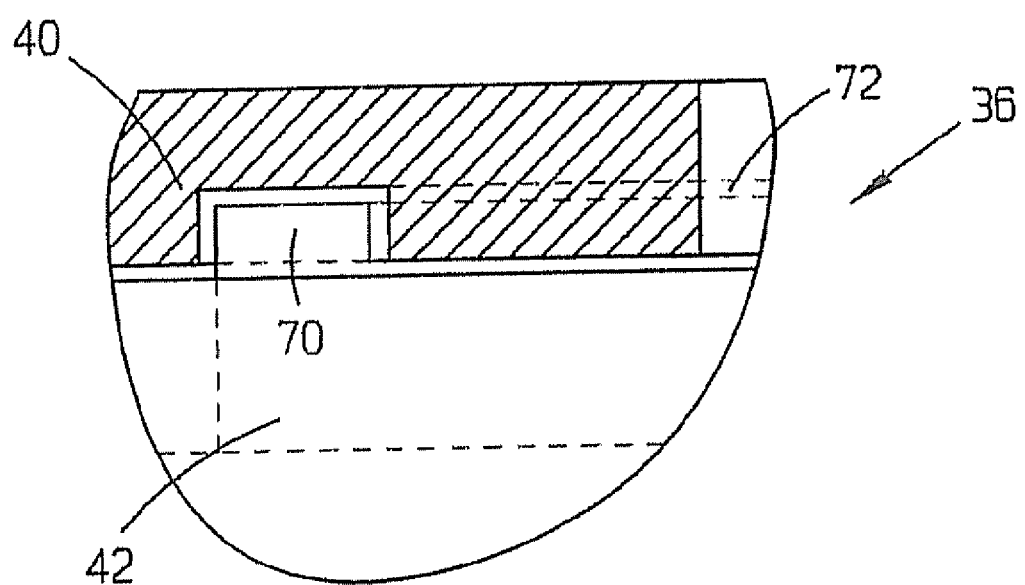
FIG. 7 is a partial cross sectional view of a lockout device, illustrating an interlocking feature of the lockout device.

An additional feature of the lockout device 10 is the interlock 36. The interlock 36 is a feature that is attached to one end of the T slot 32. The interlock 36 comprises two components, a bar crossmember 70 and an extended edge 72. The bar crossmember 70 is attached to one end of the T slot rail 54. Preferably, the bar crossmember 70 is attached to the end of the T slot rail 54 that is opposite from the end of the T slot rail to which the locking tab 34 is located. As shown in FIG. 7, the bar crossmember 70 extends from either side of the T slot rail 54 such that it will engage the extended edge 72 once telescoped to that point. The extended edge 72 is formed as a raised outer rim on either side of the T slot track 50 and is located on the same side of the lockout device 10 as the crossmember, when the lockout device is in the closed position. This allows the crossmember 70 to engage the extended edge 72 when the lockout device 10 is in the closed position.

When the lockout device 10 is assembled, the bar crossmember 70 contacts or engages the extended edge 72 when the interior half cylinder 42 is telescoped out of the exterior half cylinder 40 and the device is in the closed position. So positioned, the interlock 36 prevents further telescoping of the interior half cylinder 42 out of the exterior half cylinder 40. Such further telescoping which would result in the lockout device 10 not completely encasing the apparatus to which it is applied, as the side opposite of the interlock 36 would become open and accessible.

Although the lengths of the two half cylinders 40 and 42 that comprise a lockout device 10 differ only by a length that allows the interior half cylinder 42 to fit or nest within the exterior half cylinder 40, as described above, the half cylinder lengths of distinct lockout devices can vary significantly. Likewise, the radii of the half cylinders of distinct lockout devices 10 can vary significantly. Such variation in length and radius of the lockout device 10 provides for lockout devices of different sizes that can be installed on different apparatuses or on different sizes of the same apparatus. For example, a lockout device where the length of the half cylinders is approximately 3 inches, and the radius of the half cylinders is approximately 6 inches, is installable on a gate valve. A lockout device with a half cylinder length of approximately 12 inches and a half cylinder radius of approximately 2 inches, is installable on an electrical connection, for example. One skilled in the art should appreciate that these are merely illustrative examples and that the length and radius of a lockout device can be defined depending on the apparatus to be secured.

Although the telescoping feature 20 of this application has been generally described as a T slot track 50 and T slot rail 54, one of ordinary skill in the art should appreciate that other configurations are possible, including, for example, modification of the geometry of the slot and rail.

The half cylinders of the lockout device also have, on one or both ends of each half cylinder, a cut away flap opening 80. The cut away flap opening 80 is a generally circular opening along the axis of the lockout device 10, on one or both ends of the lockout device. However, it should be appreciated that other geometries can be used. The cut away flap opening 80 allows the lockout device 10 to be installed on whatever apparatus is to be secured. For example, in one embodiment, a cut away flap on one end of the lockout device installed on a gate valve, allows the device to fit around the stem of the gate valve. In another embodiment, a cut away flap on both ends of a lockout device installed on an electrical connection between two power cords, allows the device to fit around the electrical connection while allowing the cords to extend from either end of the lockout device.

Figure 10:
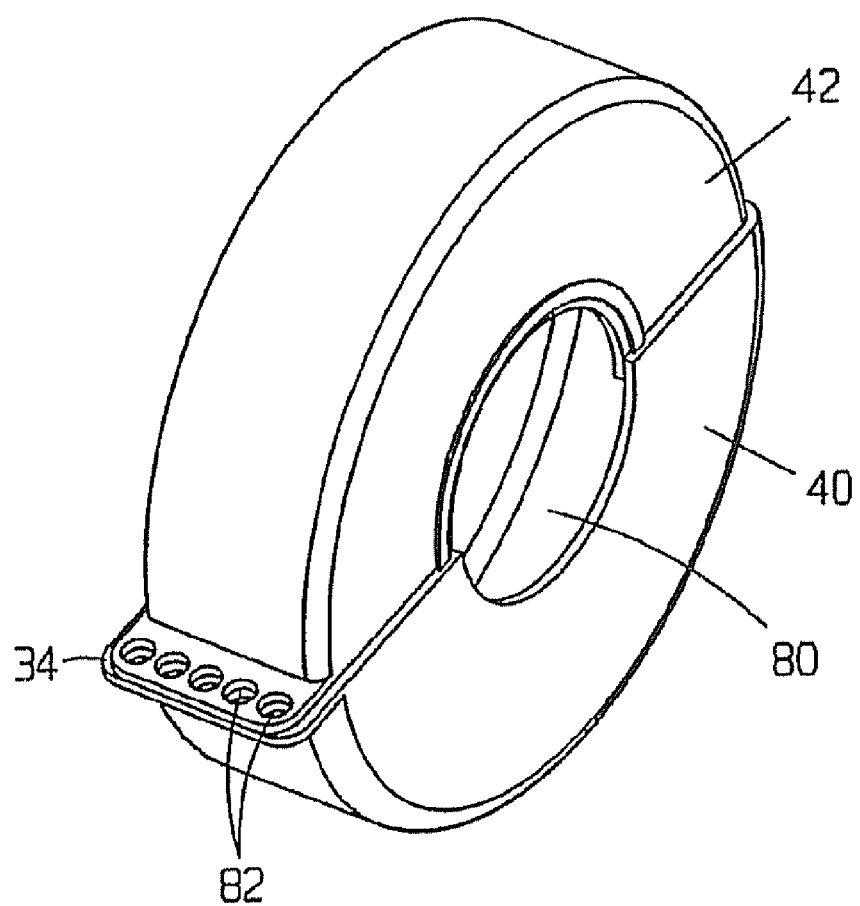
FIG. 10 is a perspective view of another lockout device, shown in the closed position.

The lockout device 10 also has two or more locking tabs 34, one attached to the exterior half cylinder 40 and at least one attached to the interior half cylinder 42. The locking tabs 34 are located in a position near one side of the half cylinders such that when the lockout device 10 is in the closed position, the tabs overlap. Each lockout tab 34 has one or more locking openings 82. The locking openings 82 of the two lockout tabs 34 overlap when the lockout device 10 is in the closed position. The overlapping of the locking openings 82 of the two locking tabs 34 allows for insertion of a lock such as a padlock, lockout hasp, or other such locking member (not shown), through the overlapping openings 82 in the overlapping locking tabs 34. The lockout device 10 preferably has multiple locking openings 82 in the locking tabs 34, providing for multiple locks to be inserted. When a lock is inserted, the lockout device 10 cannot be moved from the closed to the open position without removal of the lock. When the lockout device 10 is attached to an apparatus in order to secure that apparatus, the lockout device cannot be removed from the apparatus until the lock is removed from the lockout device. Attachment of locks to the locking tabs 34 of the lockout device 10 also makes it difficult to pry or force apart the two half cylinders of a closed lockout apparatus. An alternative design for the locking tabs is shown in FIG. 10.

In order to install a lockout device, such as, for example, the locking device 10 of FIG. 1, onto an apparatus that is desired to be secured, the lockout device is positioned near the apparatus such that, by moving the lockout device into the closed position, the apparatus will be enclosed or encased by the lockout device. Once positioned as such, the interior half cylinder 42 is rotated into the closed position such that the two locking tabs 34 overlap and a lock is placed through one or more overlapping locking openings 82. So positioned, the crossmember 70 of the interlock 36 engages the extended edge 72 of the T slot track 50. So positioned, the apparatus cannot be accessed and tampered with and the lockout device cannot be removed from the apparatus without first removing the lock. The lockout device is removed from the apparatus by reversing the order of the steps described above.

According to another inventive aspect of the present application, a telescoping or nesting lockout device may be configured to reduce areas of contact between an outer housing or shell and an inner housing or shell, thereby reducing rubbing or binding of the inner and outer shell components during movement between the open and closed positions. In one embodiment, a lockout device may be configured to include smaller bearing surfaces about which the inner and outer shell components rotate. For example, one of the inner and outer shell components may include a central bearing portion, such as a hub, ring, or wall about which the other of the inner and outer shell components rotates. FIGS. 11-13 illustrate one such lockout device 100 in which an inner housing 142 includes a circular wall 143 on one or both outer faces to engage a concentric and complementary shaped arcuate opening 141 on the outer housing 140 for rotation of the inner and outer housings 142, 140 with respect to each other. While the inner and outer housings 142, 140 may still include a rail 154 and track 150, respectively, for alignment of the inner and outer housings 142, 140 during assembly (see FIG. 12), the rail 154 and track 150 may be sized or otherwise configured such that contact between the rail and track of the assembled lockout device 100 is reduced or eliminated, thereby reducing friction between the inner and outer housings 142, 140 during movement of the lockout device between open and closed positions. As the surface area of the circular wall 143 (or hub, ring or other such bearing surface) is smaller than a bearing surface on the outer circumference of a housing would be, less friction is experienced, and the lockout device may be operated more easily. By locating bearing surfaces at the center portions of the housings, the outer circumferences may be configured to reduce or eliminate contact.

As another example of reducing friction between the inner and outer housings 142, 140 of a lockout device 100, top and/or bottom surfaces of the inner and/or outer housings 142, 140 may include one or more ribs or ridges 145 (as shown in FIGS. 12 and 13), which may reduce surface contact between the inner and outer housings. As an added benefit, the ridges 145 may provided added strength or rigidity to the housing 140. While the ridges may form any pattern on the inner surface of the outer housing 140 or the outer surface of the inner housing 142, in the illustrated embodiment, the inner surface of the outer housing 140 includes intersecting radial and concentric circular ridges 145. To further strengthen additional portions of the inner and outer housings 142, 140, the locking tabs 134 may include a flanged perimeter 134a to provide additional strength and rigidity. As with all of the features described herein, the above features may be provided on other lockout devices, such as, for example, the extended cylindrical lockout device of FIG. 8.

Telescoping and nesting lockout devices may be provided in a range of sizes, for minimization of space occupied by the lockout devices, both when in use and when in storage. For example, as shown in FIG. 14, a series of incrementally sized lockout devices 100a, 100b, 100c, 100d, 100e may be sized to nest within each other to minimize storage space when the lockout devices 100a-e are not in use.

Figure 8:
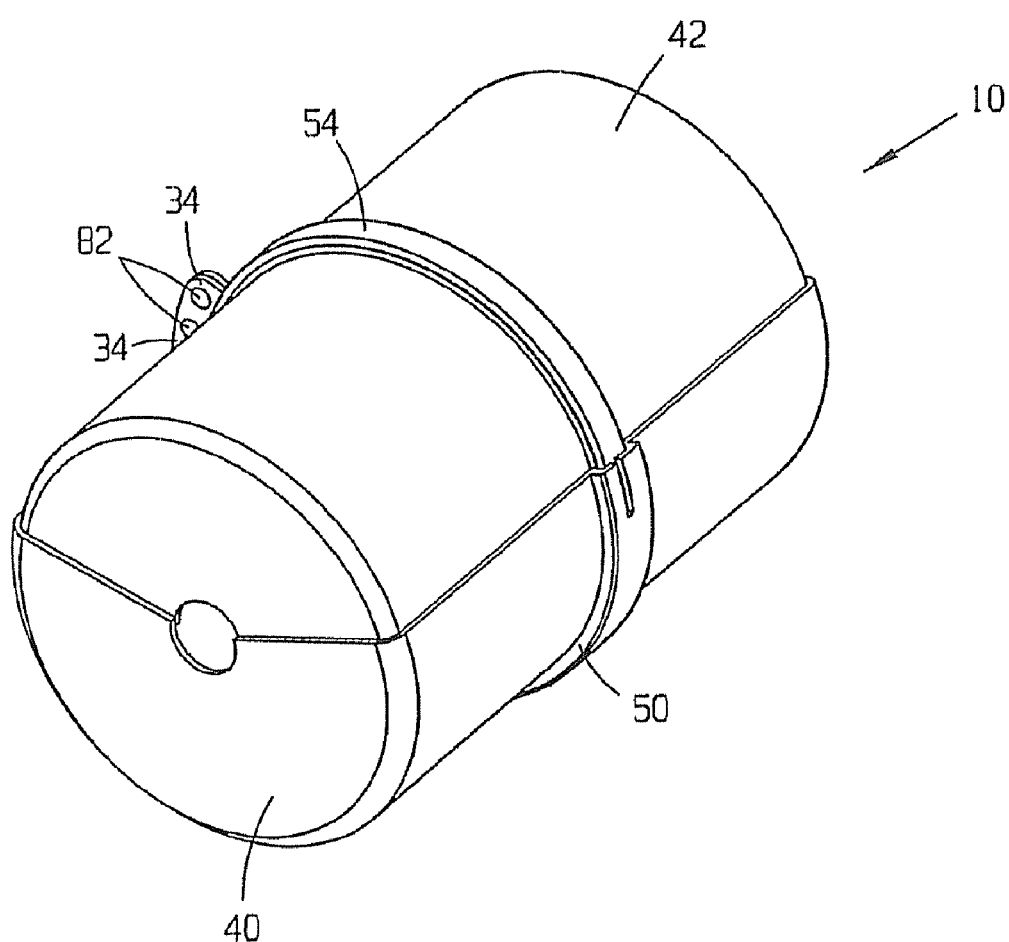
FIG. 8 is a perspective view of the a lockout device with an extended cylinder length, shown in the closed position.

To assist in retaining an inner housing 42, 142 of a lockout device 10, 100 with an outer housing 40, 140, as shown, for example in the embodiments of FIGS. 1, 8, and 11, the outer housing 40, 140 may define a radial cross-section that is greater than a half circle (or greater than 180° in circumference), such that open side edges of the outer housing 40, 140 obstruct movement of the inner housing 42, 142 out of engagement with the outer housing. In another embodiment, a central portion of the outer housing may be adapted to retain the inner housing, such that the radial cross section of the outer housing need not be larger than a half circle segment, and binding or friction between the outer circumference of the inner housing and the inner surface of the outer housing is inhibited. In one embodiment, a wall, ring, groove, or other such feature may be provided on a central portion of the outer housing, which may provide a bearing and retaining surface for engagement with the inner housing. As one example, illustrated in FIGS. 15-20, a lockout device 200 includes an outer housing 240 having a ring portion 241 for encircling and bearing against a corresponding circular wall 243 of the inner housing 242. Additionally, as shown in FIGS. 16 and 18, the bottom side of the inner housing 242 may include an arcuate wall 247 to serve as an additional bearing surface between the inner and outer housings 242, 240.

In still another embodiment, as shown in FIGS. 21-24, a lockout device 300 includes an outer housing 340 having a retaining portion 341 that defines a circular or arcuate edge surface that is greater than a half circle, such that the ends of the retaining edge 341 obstruct disengagement of the concentric circular wall portion 343 of the inner housing 342.

While the outer housing may be formed from one integral piece of material, to facilitate manufacturing and assembly with the inner housing, the outer housing may comprise upper and lower members or halves that are assembled together over the inner housing. These halves may be affixed to each other using many different methods or configurations, including, for example, adhesives, sealants, or fasteners. In one embodiment, as shown in the exploded views of FIGS. 19-20 and 23-24, at least one of the top and bottom halves 240a-b, 340a-b includes spikes, tabs, prongs, or other such projections 249, 349 for engagement with slots or holes 248, 348 the other of the top and bottom halves 240a-b, 340a-b. In one embodiment, some or all of the projections 249, 349 and corresponding holes 248, 348 may be configured to snap or lock into place with each other to provide a secure assembly, without the need for additional fasteners, sealants, or adhesives.

Other inventive features may be provided with any of the embodiments described herein. As one example, an upper surface of an inner or outer housing may include a central portion 144 (FIG. 11) that is perforated or otherwise separable (and may or may not be integral with the rest of the housing) to allow for removal of the central portion, for example, for use with components (e.g., valves, plugs, etc.) extending from the lockout device in both directions. As another example, the outer housing may include an integral mounting hole 146 (see FIG. 11) for attachment of the lockout device 100 to a piece of equipment. Also, while the illustrated embodiments are shown with a central opening in at least one of the end portions, for example, for extension of a valve stem or electrical cord therethrough, the lockout device may be provided without central openings, for example, to serve as a lockable safe or enclosure for a component or device.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A lockout device comprising:
    an inner housing having an upper end portion, a lower end portion, an arcuate outer portion extending between the upper and lower end portions, a first central bearing portion extending outward from the upper end portion, and a second central bearing portion extending outward from the lower end portion, the second central bearing portion at least partially surrounding a central opening in the lower end portion; and an outer housing having an upper end portion, a lower end portion, an arcuate outer portion extending between the upper and lower end portions, a first central opening disposed on the upper end portion and sized to receive and bear against the first central bearing portion of the inner housing, and a second central opening disposed on the lower end portion and sized to receive and bear against the second central bearing portion of the inner housing;

wherein the inner housing further comprises one of an arcuate rail and an arcuate track extending from an outer surface of the arcuate outer portion between the first and second central bearing portions, and the outer housing further comprises the other of the arcuate rail and arcuate track extending from an inner surface of the arcuate outer portion between the first and second central openings, further wherein the rail slides along the track to provide telescopic and rotational movement of the inner housing with respect to the outer housing.

2. The lockout device of claim 1, wherein each of the inner and outer housings comprises a lock tab extending from the outer portion, wherein at least one opening in the inner housing lock tab aligns with at least one opening in the outer housing lock tab when the inner and outer housings are in a closed position, to allow insertion of a locking member therethrough.

3. The lockout device of claim 1, wherein the engagement of a central bearing portion with the central opening centers the inner housing within the outer housing to prevent contact between the outer portion of the inner housing and the outer portion of the outer housing when the inner and outer housings are rotated between closed and open positions.

4. The lockout device of claim 1, wherein the outer housing comprises upper and lower housing members configured to assemble with each other and around the inner housing.

5. The lockout device of claim 4, wherein one of the upper and lower housing members comprises at least one projection and the other of the upper and lower housing members comprises at least one opening for receiving the projection for assembly of the upper and lower housing members.

6. The lockout device of claim 5, wherein the at least one projection and the at least one opening are configured for locking snap-fit engagement.

7. The lockout device of claim 1, wherein an internal surface of one of the upper and lower end portions of the outer housing comprises at least one ridge configured to reduce contacting surfaces between the outer housing and the inner housing.

8. The lockout device of claim 1, wherein the central opening of a outer housing is defined by a circular ring.

9. The lockout device of claim 1, wherein the central opening of the outer housing is defined by an arcuate edge having a circumference greater than 180 degrees.

10. The lockout device of claim 1, wherein the inner housing comprises an arcuate outer rail extending along the outer portion of the inner housing, and the outer housing comprises an arcuate inner track extending along the outer portion of the outer housing for receiving the rail therein.

11. The lockout device of claim 1, further comprising a central covering portion separably connected with the device to cover a central opening.

12. A portable lockout device for preventing use of a handle or the like, comprising: an inner piece and an outer piece, each of the inner piece and the outer piece having an arcuate outer surface and an arcuate inner surface, wherein said inner piece and said outer piece are telescopically and rotationally engaged such that said inner piece is substantially nested within said outer piece when said lockout device is in an opened position and substantially extended from within said outer piece when said lockout device is in a closed position; an arcuate rail projecting from the outer surface of said inner piece; an arcuate track disposed on the inner surface of said outer piece, wherein said rail slides along said track to provide telescopic and rotational movement of said inner and outer pieces, wherein the inner piece further comprises a first lock tab disposed on the rail, further wherein at least one opening in the first lock tab aligns with a corresponding opening in a second lock tab disposed on an outer surface of the outer piece, to allow insertion of a locking member therethrough.

13. The lockout device of claim 12, wherein the inner piece and outer piece comprise bearing surfaces spaced apart from the rail and track and configured to contact each other during rotational movement of said inner and outer pieces.

14. The lockout device of claim 13, wherein the bearing surfaces of the inner and outer pieces are disposed at a central portion of the inner and outer pieces.

15. The lockout device of claim 13, wherein the bearing surface of the outer piece is disposed on a central opening and the bearing surface of the inner piece is disposed on a central wall extending axially through the central opening.

16. The lockout device of claim 15, wherein the central opening is defined by an arcuate edge.

17. The lockout device of claim 16, wherein the arcuate edge has a circumference greater than 180 degrees.

18. The lockout device of claim 16, wherein the central opening is defined by a circular ring.

19. The lockout device of claim 15, further comprising a central covering portion separably connected with the device to cover the central opening, to restrict access to a handle when the lockout device is in the closed position over the handle.

20. The lockout device of claim 12, wherein the outer piece further comprises a portion disposed at an end of the track for receiving the first lock tab when the lockout device is in the closed position.

21. A portable lockout device for preventing use of a handle or the like, comprising: an inner piece and an outer piece, each of the inner piece and the outer piece having an arcuate outer surface and an arcuate inner surface, wherein said inner piece and said outer piece are telescopically and rotationally engaged such that said inner piece is substantially nested within said outer piece when said lockout device is in an opened position and substantially extended from within said outer piece when said lockout device is in a closed position; an arcuate rail projecting from the outer surface of said inner piece; an arcuate track disposed on the inner surface of said outer piece, wherein said rail slides along said track to provide telescopic and rotational movement of said inner and outer pieces, wherein the outer piece is formed from an upper member defining a first side of the track and a lower member defining a second side of the track, the upper and lower members being joined together to capture the rail between the first and second sides of the track.

* * * * *

UNITED STATES PATENT AND TRADEMARK OFFICE
CERTIFICATE OF CORRECTION

| | | |
|---|---|---|
| PATENT NO. | : 7,752,876 B2 | Page 1 of 1 |
| APPLICATION NO. | : 11/695431 | |
| DATED | : July 13, 2010 | |
| INVENTOR(S) | : Glenn P. Meekma et al. | |

It is certified that error appears in the above-identified patent and that said Letters Patent is hereby corrected as shown below:

Claim 8, Column 9, line 52, after "wherein" delete the word "the" and insert --a--.

Claim 9, Column 9, line 55, after "wherein" delete the word "the" and insert --a--.

Claim 21, Column 10, line 61, delete the word "members" and insert the word --member--.

Signed and Sealed this

Seventh Day of September, 2010

David J. Kappos
*Director of the United States Patent and Trademark Office*